United States Patent
Hunter, Jr. et al.

(10) Patent No.: US 8,880,915 B2
(45) Date of Patent: Nov. 4, 2014

(54) DISTRIBUTED ANTENNA SYSTEM USING POWER-OVER-ETHERNET

(75) Inventors: Roger A. Hunter, Jr., Concord, VA (US); Donald Robert McAllister, Lynchburg, VA (US); Christopher G. Ranson, Concord, VA (US); Thomas Kummetz, Forest, VA (US)

(73) Assignee: Andrew LLC, Hickory, NC (US)

( * ) Notice: Subject to any disclaimer, the term of this patent is extended or adjusted under 35 U.S.C. 154(b) by 237 days.

(21) Appl. No.: 13/491,849

(22) Filed: Jun. 8, 2012

(65) Prior Publication Data

US 2012/0317426 A1    Dec. 13, 2012

Related U.S. Application Data

(60) Provisional application No. 61/495,067, filed on Jun. 9, 2011.

(51) Int. Cl.
| | |
|---|---|
| G06F 1/00 | (2006.01) |
| G06F 1/32 | (2006.01) |
| G05D 3/12 | (2006.01) |
| H04L 12/10 | (2006.01) |
| H04L 12/40 | (2006.01) |
| H04L 12/24 | (2006.01) |

(52) U.S. Cl.
CPC ............. *H04L 12/10* (2013.01); *H04L 41/0833* (2013.01); *H04L 12/40045* (2013.01)
USPC .............................. 713/300; 713/320; 700/286

(58) Field of Classification Search
CPC ..................................................... G06F 1/3203
USPC .......................................................... 713/300
See application file for complete search history.

(56) References Cited

U.S. PATENT DOCUMENTS

| | | | |
|---|---|---|---|
| 6,643,566 B1 * | 11/2003 | Lehr et al. ...................... | 700/286 |
| 6,996,458 B2 | 2/2006 | Pincu et al. | |

(Continued)

FOREIGN PATENT DOCUMENTS

| | | |
|---|---|---|
| CN | 201199696 Y | 2/2009 |
| WO | 2012170834 A1 | 12/2012 |

OTHER PUBLICATIONS

International Search Report and Written Opinion in International Patent Application No. PCT/US2012/041576, mailed Jul. 17, 2012, 13 pages.

*Primary Examiner* — Suresh Suryawanshi
(74) *Attorney, Agent, or Firm* — Kilpatrick Townsend & Stockton LLP

(57) ABSTRACT

A system is provided for adjusting power provided to a device. The system can include power sourcing equipment and a sub-system. The power sourcing equipment can provide power to a powered device via a channel. The sub-system can determine an amount by which to increase the power based on a resistance of the channel. The power sourcing equipment or the powered device can adjust the power (or load) responsive to a command from the sub-system. The sub-system can include a measurement device and a processor. The measurement device can measure an output voltage of the power sourcing equipment, an input voltage of the powered device, and a current on the channel. The processor can determine the resistance of the channel based on the output voltage, the input voltage, and the current. The processor can output a command specifying an increase or decrease in power supplied by the power sourcing equipment.

20 Claims, 8 Drawing Sheets

(56) References Cited

U.S. PATENT DOCUMENTS

| | | |
|---|---|---|
| 7,162,261 B1 | 1/2007 | Yarkosky et al. |
| 7,283,844 B2 | 10/2007 | Thompson |
| 7,330,734 B2 | 2/2008 | Shpak |
| 7,336,961 B1 | 2/2008 | Ngan |
| 7,355,416 B1 * | 4/2008 | Darshan .................. 324/713 |
| 7,417,443 B2 * | 8/2008 | Admon et al. ............. 324/713 |
| 7,511,515 B2 * | 3/2009 | Herbold .................... 324/691 |
| 7,656,855 B2 | 2/2010 | Ghassemzadeh et al. |
| 7,738,877 B2 | 6/2010 | Amos |
| 7,783,270 B1 | 8/2010 | Haab et al. |
| 7,885,250 B2 | 2/2011 | Whitaker |
| 7,942,701 B2 | 5/2011 | Anderson et al. |
| 8,028,175 B2 * | 9/2011 | Diab et al. ................ 713/300 |
| 8,356,191 B2 * | 1/2013 | Schindler ................. 713/300 |
| 8,386,820 B2 * | 2/2013 | Diab ......................... 713/320 |
| 2006/0164108 A1 | 7/2006 | Herbold |
| 2007/0064922 A1 * | 3/2007 | Schindler ................ 379/395.01 |
| 2007/0189308 A1 | 8/2007 | Tchigevsky et al. |
| 2007/0286599 A1 | 12/2007 | Sauer et al. |
| 2008/0058018 A1 | 3/2008 | Scheinert |
| 2008/0129118 A1 * | 6/2008 | Diab ........................... 307/35 |
| 2008/0148081 A1 * | 6/2008 | Diab et al. ................. 713/320 |
| 2008/0164890 A1 | 7/2008 | Admon et al. |
| 2008/0225770 A1 | 9/2008 | Cho et al. |
| 2010/0099451 A1 | 4/2010 | Saban et al. |
| 2010/0177759 A1 | 7/2010 | Fischer et al. |
| 2010/0178936 A1 | 7/2010 | Wala et al. |
| 2010/0208777 A1 | 8/2010 | Ogaz |
| 2010/0278530 A1 | 11/2010 | Kummetz et al. |
| 2011/0241425 A1 | 10/2011 | Hunter, Jr. et al. |

* cited by examiner

DISTRIBUTED ANTENNA SYSTEM USING POWER-OVER-ETHERNET

CROSS-REFERENCE TO RELATED APPLICATIONS

This application claims priority to U.S. Provisional Application Ser. No. 61/495,067 filed Jun. 9, 2011 and titled "Distributed Antenna System Using Power-Over-Ethernet, " the contents of which are hereby incorporated by reference.

TECHNICAL FIELD

The present invention relates generally to telecommunications and more particularly (although not necessarily exclusively) to a method and system for delivering power over Ethernet cables.

BACKGROUND

Numerous powered devices utilize power over multi-pair Ethernet cables. The IEEE 802.3at-2009 Power-over-Ethernet ("PoE") standard, ratified Sep. 11, 2009, defines a standardized approach for providing power over Ethernet cables.

A non-limiting example of an Ethernet cable is a category 5 cable. A category 5 cable includes eight wire connectors grouped into four wire pairs. Under the IEEE 802.3at-2009 PoE standard, power sourcing equipment can provide DC power over two of the four wire pairs included in the cable. Such pairs are generally referred to as a PoE powered pair or powered cable pair. Power can be injected into the powered cable pairs of a cable using Ethernet magnetics in a pair of PoE taps. A "pair of PoE taps" refers to the center taps of two of the four wire pairs in an Ethernet cable.

In PoE systems, one tap of a pair of PoE taps is used for power delivery and a second tap is used for power return. The power is injected into the center tap of the Ethernet transformer of one of the twisted pairs in the powered cable pair. The return is extracted at the center tap of the Ethernet transformer of a second twisted pair of the power cable pair. Direct current ("DC") power can be provided over the powered cable pairs as a common mode current. Telecommunications systems can utilize the pairs in the cable as data lines. Data can be provided over one or more wire pairs as a differential signal. In some systems, power and data may be provided on the same twisted pair. The Ethernet device receiving the power and data via the Ethernet cable can include a differential input that suppresses the bias and noise associated with the common mode current. As a result, providing DC power as a common mode current reduces the interference to the data signals.

Under the IEEE 802.3at-2009 PoE standard, power sourcing equipment can provide a powered device with up to up to 25.5 watts of DC power over, for example, a category 5 twisted pair communication cable. As telecommunications devices adapt to meet new communication demands, however, such devices may have different power needs or demands. For example, as more functionality is added to communication devices and systems, such devices and systems may include powered peripheral devices that couple with or are plugged into the main communication devices. Such peripheral devices may need more than 25.5 watts of power.

Accordingly, a versatile system and method for providing PoE power communication devices in a wireless communications system is desirable.

SUMMARY

In some aspects, a system is provided that includes power sourcing equipment and a sub-system. The power sourcing equipment can provide power to a powered device via a channel. The sub-system can determine, based on a resistance of the channel, an amount by which to increase a level of power provided to the powered device. The power sourcing equipment can adjust the level of power by the amount in response to a command from the sub-system.

Another aspect is a system that includes at least one measurement device and a processor. The measurement device can measure an output voltage of the power sourcing equipment, measure an input voltage of the powered device, and measure a current on the channel. The processor can determine the resistance of the channel based on the output voltage, the input voltage, and the current. The processor can output a command to the power sourcing equipment to increase the level of power and the amount by which to increase the level of power.

Another aspect is a system that includes a powered device, power sourcing equipment, a channel, and a sub-system. The power sourcing equipment can provide power to the powered device. The channel can couple the power sourcing equipment to the powered device. The sub-system can include at least one measurement device and a processor. The measurement device can measure an output voltage of the power sourcing equipment, measure an input voltage of the powered device, and measure a current on the channel. The processor can be communicatively coupled to the power sourcing equipment. The processor can determine the resistance of the channel based on the output voltage, the input voltage, and the current. The processor can determine, based on the resistance of the channel, an amount by which to increase a level of power provided to the powered device. The processor can output a command to the power sourcing equipment to increase the level of power and the amount by which to increase the level of power.

These illustrative aspects and features are mentioned not to limit or define the invention, but to provide examples to aid understanding of the inventive concepts disclosed in this application. Other aspects, advantages, and features of the present invention will become apparent after review of the entire disclosure.

DETAILED DESCRIPTION

Figure 1:
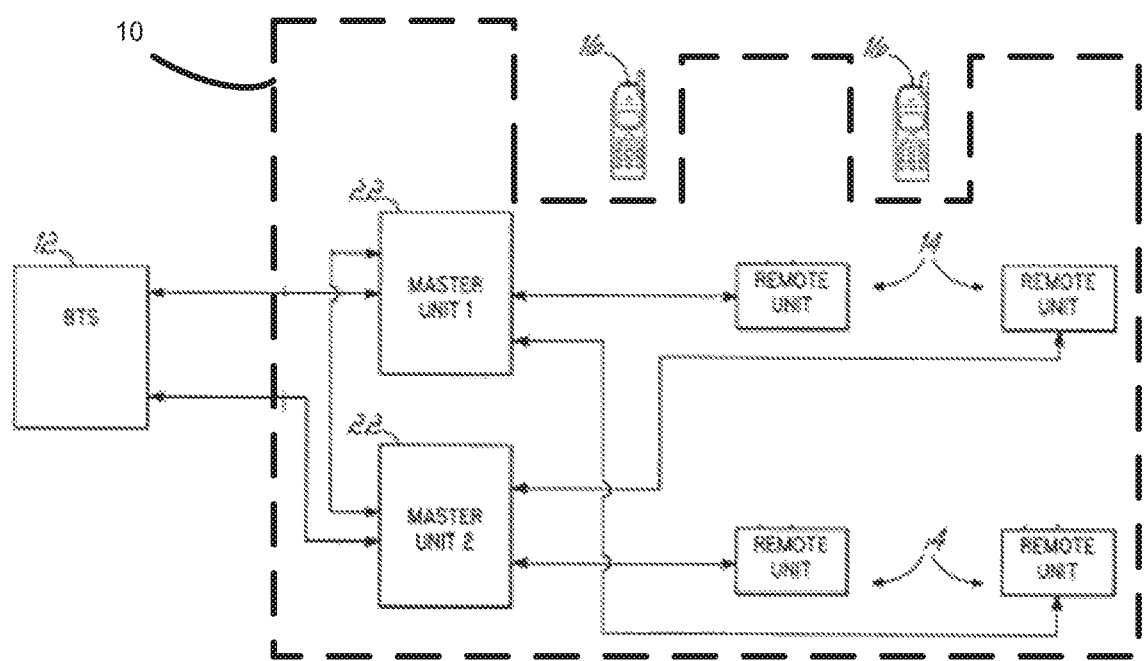
FIG. 1 is a schematic view of a distributed antenna system in which a PoE system can be disposed according to one aspect.

Certain aspects and features of the present invention are directed to a PoE system for a distributed antenna system ("DAS"). A DAS can include a master unit communicating telecommunication information between base stations or other equipment of cellular service providers and remote antenna units distributed in an area and capable of wirelessly communicating with wireless devices. Power can be delivered via PoE from power source equipment ("PSE"), which may be in a master unit, to a powered device ("PD"), which may be in a remote antenna unit.

A PoE system according to some aspects may also include a system for adjusting the power provided by a PSE to one or more PDs based on the resistance of a channel that includes an Ethernet cable coupling the PSE to one or more of the PDs. The PoE system can include hardware and/or software for adjusting power supplied by the PSE. The hardware and/or software for adjusting power supplied by the PSE may be disposed in the PSE, in the PD, or in an external controller. The PoE system may provide more power than contemplated by the IEEE standard by using both powered pairs of an Ethernet cable and/or multiple Ethernet cables to provide power.

In some aspects, the amount of provided power can be adjusted based on the quality of the channel that includes an Ethernet cable. For example, the PoE system can increase power provided to a PD in response to determining that the resistance of the channel does not exceed a threshold resistance. In some aspects, the PoE system can configure the PD to be operated at full power in response to determining that the resistance of the channel does not exceed the threshold resistance. In other aspects, the PoE system can selectively provide power to one or more optional loads of the PD based on the resistance of the channel. In some aspects, the PD can be powered off or operated in a "safe mode" if the resistance of the channel exceeds the threshold resistance.

In some aspects, the PoE system can balance power loads among powered pairs. Balancing the power loads may include equalizing the power provided over powered pairs, equalizing the current on powered pairs, or equalizing the power loss across powered pairs.

Other aspects of a system for adjusting the power provided by a PSE to one or more PDs in a DAS can be implemented using other types of channel having a conductive material over which both power and data can be transported. For example, a system may include a PSE providing data and power over a channel that includes a coaxial cable to the PD. Power can be provided over the coaxial cable by providing current via the center conductor of the coaxial cable and receiving return current via the shield conductor.

A "channel" includes one or more physical components that can transmit information from one network location to another network location. Examples of physical components that, individually or in combination, can form a channel include cables, cordage, patch panels, outlets, concentration points, other interfacing equipment, and any equipment included in or related to a communications link. Cables can include Ethernet cables, coaxial cables, or other types of cables.

Detailed descriptions of these aspects are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative aspects but, like the illustrative aspects, should not be used to limit the present invention.

FIG. 1 schematically depicts a DAS 10 in which a PoE system can be disposed according to one aspect. The DAS 10 can be communicatively coupled to at least one base station 12 via a wired or wireless communication medium. The DAS 10 can be positioned in an area such as a building environment to extend wireless communication coverage.

The DAS 10 can include one or more remote antenna units 14 that are distributed in the environment to provide coverage within a service area of the DAS 10. The remote antenna units 14 can service a number of different user devices 16, such as cellular phones, operating in the environment of the DAS 10.

The remote antenna units 14 can be communicatively coupled to one or more master units 22 via any communication medium capable of carrying signals between the master unit 22 and remote antenna unit 14. A non-limiting example of a suitable communication medium is an Ethernet cable. Master units 22 can process the signals from remote antenna units 14 to interlace appropriately with the base station 12. Although DAS 10 is depicted as including two master units 22 and four remote antenna units 14, any number (including one) of each of master units 22 and remote antenna units 14 can be used.

The PDs in a DAS 10, such as remote antenna units 14, can be powered using a PoE system. The PoE system can include components disposed in master units 22 and/or remote antenna units 14.

Figure 2:
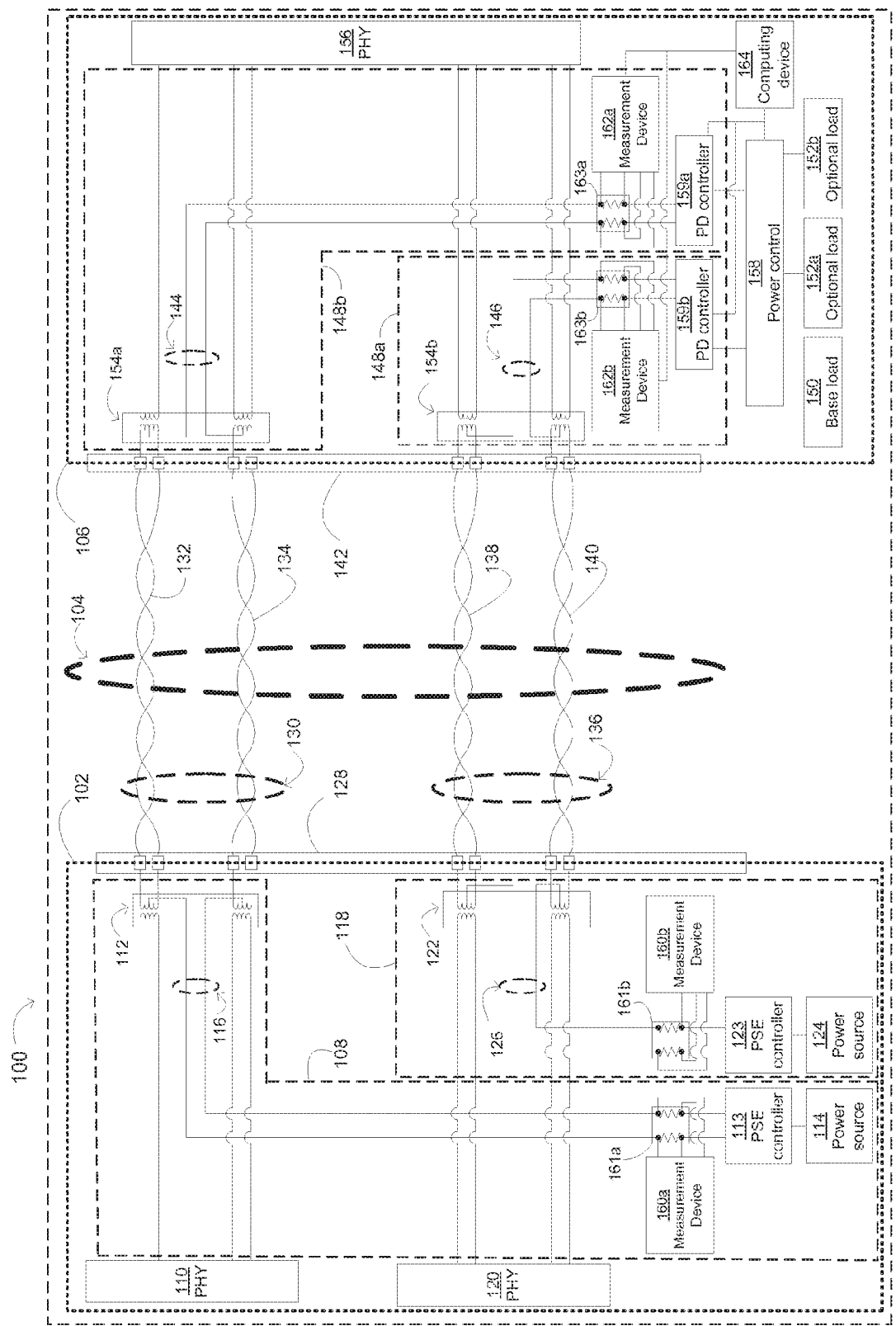
FIG. 2 is a schematic diagram of a PoE system according to one aspect.

FIG. 2 depicts a functional block diagram of a PoE system 100 for use in a DAS 10 or other communication system according to one aspect. PoE system 100 may include PSE 102, a communication channel 104, and a PD 106.

PSE 102 can include any device or system configured or otherwise operable to supply power to a PD 106 over one or more Ethernet cables. PSE 102 may include physical layer ("PHY") devices 110, 120 and PSE port units 108, 118. PSE port units 108, 118 can be coupled to PSE output port 128.

PHY devices 110, 120 can be any physical layer device providing a data interface to a communication network. A non-limiting example of a PHY device is an Ethernet physical transceiver. PHY devices 110, 120 can provide data that is transported via communication channel 104. PHY devices according to some aspects can also determine characteristics of the communication channel 104, such as the electrical length of the communication channel 104, and loss characteristics, such as loss over frequency and the signal-to-noise ratio, of signals provided over the communication channel 104.

PSE port units 108, 118 can provide and control power on communication channel 104. PSE port units 108, 118 can be co-located in a single component or disposed in separate components. PSE port unit 108 may include a PSE controller 113, a power source 114, Ethernet magnetics 112, and a measurement device 160a. PSE port unit 118 may include a PSE controller 123, a power source 124, Ethernet magnetics 122, and a measurement device 160b.

Power sources 114, 124 can provide the power to be transmitted to PD 106. PSE controllers 113, 123 can adjust the power provided over communication channel 104 to PD 106. PSE controllers 113, 123 can also verify that a resistive load is available to receive power. Verifying that a resistive load is available can include determining whether a short circuit exists in the communication channel 104. In some aspects, the PSE controllers 113, 123 can be disposed in a single component such as a dual PSE controller. A dual PSE controller can be disposed in PSE 102 and external to the PSE port units 108, 118.

Ethernet magnetics 112, 122 can provide both data from PHY devices 110, 120 and power from PSE port units 108, 118 to communication channel 104.

PSE 102 can be connected to communication channel 104 via PSE output port 128. PSE port unit 108 can be coupled to PSE output port 128 via tap connection 116. PSE port unit 118 can be coupled to PSE output port 128 via tap connection 126. PSE output port 128 may be a PoE-enabled communication port. A non-limiting example of a PoE enabled communication port is an RJ-45 Ethernet interface port.

Communication channel 104 can be any type of channel over which both power and data can be provided. Examples components included in the communication channel 104 can include (but are not limited to) an Ethernet cable such as category 5, category 5e, category 6, category 6A, or category 7 cables, coaxial cable, cordage, patch panels, outlets, concentration points, other interfacing equipment, and any equipment included in or related to a communications link. Communication channel 104 may include powered pairs 130, 136. Powered pair 130 can include wire pair 132 and wire pair 134. PSE port unit 108 can provide power over powered pair 130 via tap connection 116. Powered pair 136 can include wire pair 138 and wire pair 140. PSE port unit 118 can provide power over powered pair 136 via tap connection 126.

PD 106 can receive power from PSE 102 via communication channel 104. PD 106 and PSE 102 can also transmit and receive data via communication channel 104. Data can be transmitted over either or both of powered pairs 130, 136. PD 106 may be a universal access point, such as a remote antenna unit. PD 106 can include PD input port 142. PD input port 142 can be a PoE-enabled communication port. PD 106 can be connected to communication channel 104 via PD input port 142.

In some aspects, PD 106 may include PD port units 148a-b, power control circuitry 158, base load 150, one or more optional loads 152a-b, and PHY device 156, PD port units 148a-b can be coupled to PD input port 142 via tap connections 144, 146. PD port units 148a-b can also be coupled to power control circuitry 158.

PD port units 148a-b may include magnetics 154a-b and one or more PD controllers 159a-b. Magnetics 154a-b can be configured to receive power and data from communication channel 104. PD port unit 148a can use magnetics 154a to extract power from powered pair 130 via tap connection 144. PD port unit 148b can use magnetics 154b to extract power from powered pair 136 via tap connection 146.

PHY device 156 can receive and route the data extracted from communication channel 104 by PD port unit 148a. PHY device 156 can also determine characteristics of the communication channel 104 and the loss characteristics of signals provided over the communication channel 104.

The PD controllers 159a-b can communicate with the power control circuitry 158 to determine whether the base load 150 or the optional loads 152a-b are available to receive power. PD controllers 159a-b can communicate control messages to the PSE controllers 113, 123 to verify that the resistive loads are present.

Power control circuitry 158 can receive and route the power extracted from communication channel 104. Power control circuitry 158 can control and provide power to base load 150 and optional loads 152a-b. Power control circuitry 158 can also convert between AC power and DC power. Providing power to base load 150 and optional loads 152a-b can include switching power from PD port units 148a-b between the base load 150 and optional loads 152a-b and balancing the power provided to the base load 150 and optional loads 152a-b.

Base load 150 can include the minimum circuitry functions for operating PD 106. Optional loads 152a-b can include one or more add-on components that augment the capabilities of PD 106. For example, where PD 106 is a remote antenna unit, optional loads 152a-b may be additional digital signal processing boards that extend the available frequency range of the remote antenna unit. Although PD 106 is depicted as including two optional loads 152a-b, any number (including one) of multiple optional loads 152a-b can be included in PD 106.

In some aspects, PD 106 can support one or more optional loads by one or more pass-through communication ports. A pass-through communication port can pass data and power to another PD. The power of the pass-through communication port may be the full power received on one or both powered pairs 130, 136, or a fraction of the total received power.

In the PoE system depicted in FIG. 2, PSE 102 can provide power over both powered pairs 130, 136. In other aspects, PSE 102 can provide power over a single communication channel 104 or PoE power can be provided over multiple communication channels. In a PoE system using both powered pairs of a communication channel and/or multiple communication channels, PSE 102 can provide power of up to 100 watts or more.

PoE system 100 can also include a sub-system for measuring the resistance of communication channel 104 and adjusting the power provided to PD 106 based on the resistance. The sub-system may include measurement devices 160a-b, 162a-b, and computing device 164.

Measurement devices 160a-b, 162a-b may be any device or group of devices capable of measuring current and voltage. Measurement devices 160a-b, 162a-b can include measurement bridges 161a-b, 163a-b. Each measurement bridge can include one or more shunt resistors for measuring the current on each wire pair. Examples of measurement devices can include (but are not limited to) onboard devices disposed in PSE 102 or PD 106, such as voltage and current sense amplifiers and analog-to-digital converters. Other examples of measurement devices can include (but are not limited to) external devices such as a voltmeter, a potentiometer, an oscilloscope, and an ampere or current meter.

In some aspects, PSE controllers 113, 123 can provide data on the output voltage or current and PD controllers 159a-b can measure input voltage and current, which may obviate the need for measurement devices 160a-b, 162a-b.

Measurement devices 160a-b can be disposed in PSE port units 108, 118 and coupled to tap connections 116, 126, respectively. Measurement device 160a can measure the voltage across tap connection 116 and current at tap connection 116. Measurement device 160b can measure the voltage across tap connection 126 and current at tap connection 126. The measured voltages across tap connections 116, 126 can be used to determine the combined voltage across PSE output port 128.

Measurement devices 162a-b can be disposed in PD port units 148a-b and coupled to tap connections 144, 146, respectively. Measurement device 162a can measure the voltage across tap connection 144 and current at tap connection 144. Measurement device 162b can measure the voltage across tap connection 146 and current at tap connection 146. The measured voltages across tap connections 144, 146 can be used to determine the combined voltage across PD input port 142.

Computing device 164 can be communicatively coupled to measurement devices 160a-b, 162a-b, PD 106, and PSE 102.

Figure 3:
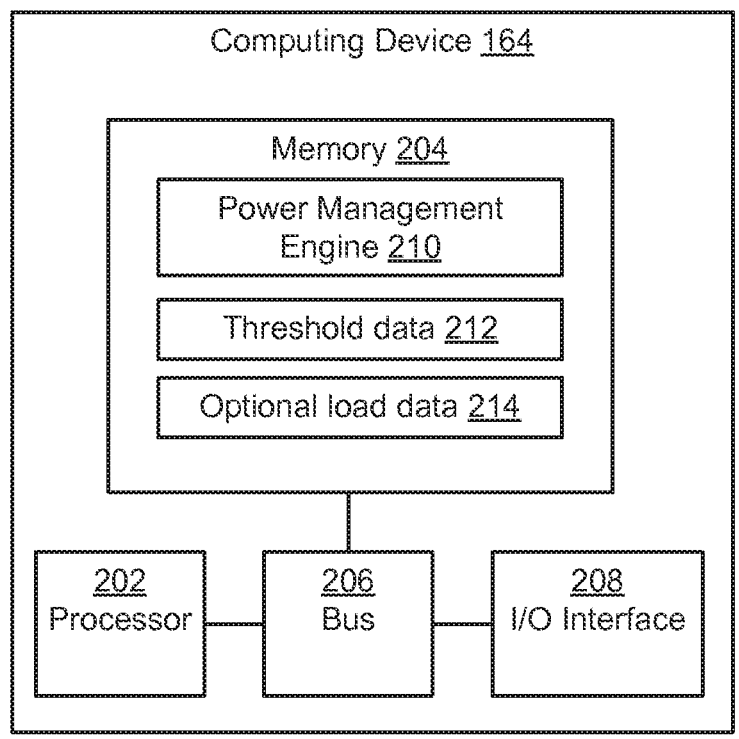
FIG. 3 is a block diagram of a computing device with code capable of adjusting power loads of a powered device in a PoE system according to one aspect.

Although computing device 164 is depicted as being disposed in PD 106, computing device 164 can alternatively be disposed in PSE 102 or in an external device. Computing device 164 can adjust power provided to PD 106 based on the resistance of communication channel 104. FIG. 3 depicts a block diagram of a computing device 164 for adjusting power provided to PD 106 according to one aspect. Computing device 164 may be any device that can process data and execute code that is a set of instructions to perform actions. In some aspects, the computing device 164 is a simple device that provides an alarm based on a given threshold to perform power adjustments via software or directly via hardware. The threshold may be hardwire or adjustable, such as via software. The computing device 164 may be part of the measurement device 162 instead of a separate component.

The computing device 164 includes a processor 202 that can execute code stored on a computer-readable medium, such as a memory 204, to cause the computing device 164 to manage power provided to PD 106. Examples of processor 202 include a microprocessor, an application-specific integrated circuit ("ASIC"), a field-programmable gate array ("FPGA"), or other suitable processor. The processor 202 may include one processor or any number of processors.

Processor 202 can access code stored in memory 204 via a bus 206. Memory 204 may be any non-transitory computer-readable medium capable of tangibly embodying code and can include electronic, magnetic, or optical devices. Examples of memory 204 include random access memory ("RAM"), read-only memory ("ROM"), magnetic disk, an ASIC, a configured processor, or other storage device. Bus 206 may be any device capable of transferring data between components of the computing device 164. Bus 206 can include one device or multiple devices.

Instructions can be stored in memory 204 as executable code. The instructions can include processor-specific instructions generated by a compiler and/or an interpreter from code written in any suitable computer-programming language, such as C, C++, C#, Visual Basic, Java, Python, Perl, JavaScript, and ActionScript.

The instructions can include a power management engine 210. The power management engine 210 can be executed by the processor 202 to cause the computing device 164 to adjust power provided to PD 106, as explained in more detail below. The computing device 164 can receive inputs via input/output ("I/O") interface 208. The computing device 164 can store data representing such inputs in memory 204. Examples of such inputs can include measurements received from measurement devices 160a-b, 162a-b and a type of channel for the communication channel 104. In some aspects, the type of channel for the communication channel 104 can be received via a graphical interface displayed on a separate computing device or on a display associated with the computing device 164. Various types of data for various channel types can be stored as a data file in memory 204. Using the type of channel for the communication channel, the power management engine 210 can determine data, such as resistivity and cross-sectional area, about the communication channel 104 from the associated data in memory 204. The power management engine 210 can determine, and store in memory 204, a length of the communication channel 104 based on data received from a physical layer device and the type of channel. Power management engine 210 can determine the length by dividing the resistivity of communication channel 104 by the product of the resistance and cross-sectional area of communication channel 104. The power management engine 210 can determine temperature for the communication channel 104 based on the length, voltage measurements, and current measurement. The temperature for the communication channel 104 can be stored in memory 204.

Power management engine 210 can also determine the total resistance of communication channel 104 or the individual resistances of powered pairs 130, 136. Power management engine 210 can also determine whether the resistance exceeds a predetermined threshold and adjust the power provided to PD 106 accordingly. Power management engine 210 can generate control signals for computing device 164 to transmit to PSE 102 and/or PD 106.

Memory 204 can also include threshold data 212. Threshold data 212 may be a data file. Threshold data 212 can include information on the acceptable resistance for a communication channel 104 based on the power requirements of various PDs 106. Threshold data 212 can also include other information related to the safe operation of the PoE system, such as the acceptable operating temperature of communication channel 104. In some aspects, threshold data 212 can be stored separately from the computing device 164 in a computer-readable medium accessible by the computing device 164 via the I/O interface 208.

Memory 204 can also include load data 214. Load data 214 may be a data file. Load data 214 can include information on the power requirements for base load 150 and optional loads 152a-b in PD 106. Load data 214 can include a priority for each of optional loads 152a-b specifying the order in which to activate each of the optional loads 152a-b. In some aspects, load data 214 can be stored separately from the computing device 164 but in communication with the computing device 164 through I/O interface 208.

In some aspects, the processor 202 can execute the power management engine 210 to determine a channel resistance based on an impedance in the PD. For example, the impedance in the PD may be known and the current and voltage in the PSE can be measured. Power level and load allocation decisioning can be performed based on the determined channel resistance based on the known impedance in the PD.

Figure 8:
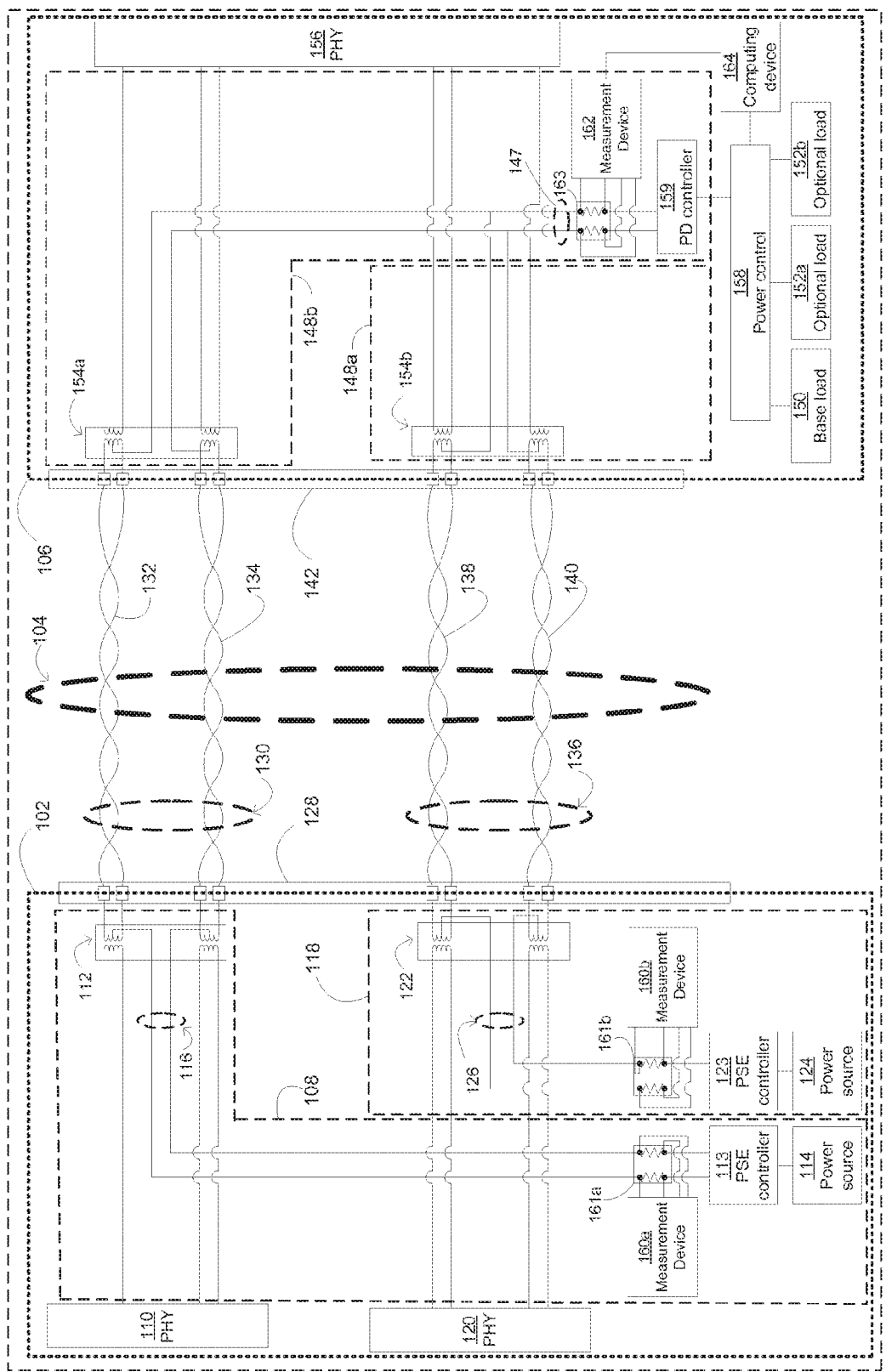
FIG. 8 is a schematic diagram of a PoE system according to a second aspect.

This exemplary system configuration is provided to illustrate configurations of certain aspects. Other configurations and aspects may of course be utilized. For example, a PoE system according to some aspects may be implemented using a single PD controller and measurement device. FIG. 8 schematically depicts a PoE system that includes a single PD controller 159, a single measurement device 163, and a single measurement bridge. The PoE system is otherwise similar to the PoE system depict in FIG. 2, except that tap connections 144, 146 in FIG. 2 are joined together as tap connection 147 in FIG. 8. The PoE system in FIG. 8 may be configured to provide a threshold alarm at the PD 106 indicating the presence of a possible problem, such as high temperature or power overload problems. The computing device 164 can respond to the alarm condition, and may adjust threshold levels. This process may be autonomously implemented and the computing device 164 may not be required to react to problems with power of the channel.

Figure 4:
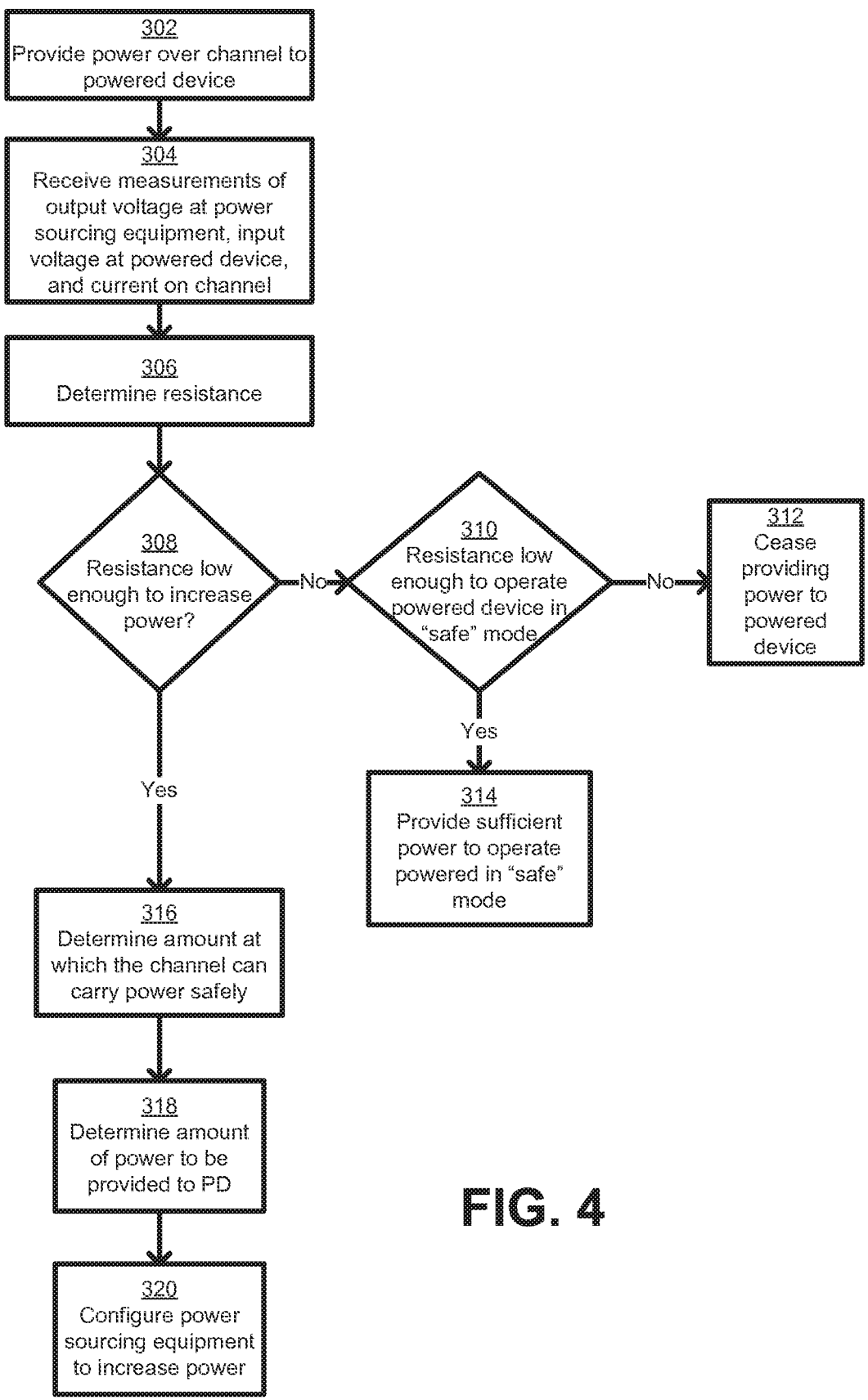
FIG. 4 is a flow chart illustrating a process for adjusting power provided to a powered device based on the channel resistance in a PoE system according to one aspect.

FIG. 4 depicts a flow chart illustrating a process for adjusting power provided to a PD according to certain aspects of the present invention. The process is described with reference to the PoE system 100 depicted in FIG. 2 and the system implementation shown in FIG. 3. Other implementations and processes, however, are possible.

In block 302, power management engine 210 configures PSE 102 to provide power to PD 106 over communication channel 104. In some aspects, the power from PSE 102 may not exceed the maximum power provided in PoE systems as specified according to standardized PoE protocols. For example, the level of power provided over communication channel 104 may be less than full power or a minimal power level at which the quality of the communication channel 104 can be assessed.

In block 304, the power management engine 210 receives measurements from measurement devices. The measurements can include the voltage at PSE output port 128 from measurement devices 160a-b, the voltage at PD input port 142 from measurement devices 162a-b, and the current on communication channel 104 from measurement devices 160a-b or 162a-b. In some aspects, measurement devices 160a-b, 162a-b may be disposed in PSE 102 and/or PD 106, as depicted in FIG. 2. In other aspects, the measurement devices may be disposed in devices external to PSE 102 and PD 106.

In block 306, power management engine 210 determines the resistance of communication channel 104. The resistance can be determined, for example, by dividing the difference in voltages at PSE output port 128 and PD input port 142 by the current on communication channel 104. In other aspects, a measurement device can measure the resistance of the communication channel 104 and the power management engine 210 can receive the resistance from the measurement device. Examples of a measurement device can include (but are not limited to) onboard devices, such as voltage and current sense amplifiers and analog-to-digital converters, disposed in PSE 102 or PD 106. A measurement device can alternatively be a device external to PSE 102 or PD 106, such as an ohmmeter.

In block 308, power management engine 210 determines whether the resistance of communication channel 104 exceeds an acceptable threshold resistance for safely increasing power to PD 106. For example, power management engine 210 can access threshold data 212 to identify the acceptable threshold resistance. In some aspects, the threshold data 212 is a table that can include resistances associated with various types of channels and with ranges of acceptable power levels. Power management engine 210 can access the threshold data 212 to identify the threshold resistance for the type of channel of the communication channel 104. The power management engine 210 can compare the resistance determined for the communication channel 104 to the threshold resistance for the type of channel of the communication channel 104. The threshold resistance may be the channel resistance for a channel type at which a maximum power level can be safely carried, as specified in threshold data 212.

In other aspects, the power management engine 210 determines whether a resistance of the communication channel 104 exceeds a threshold by determining, based on the resistance and the channel type, whether a maximum power level of power would cause the temperature of the communication channel 104 to exceed an acceptable temperature, as specified in threshold data 212. In some aspects, the power management engine 210 can determine the channel temperature from the length and the current and voltage difference across communication channel 104.

If the resistance of communication channel 104 exceeds an acceptable threshold resistance, power management engine 210 determines if the resistance of communication channel 104 is low enough for PD 106 to operate in a "safe" mode in block 310. Power management engine 210 can access threshold data 212 to identify the acceptable resistance for PD 106 to operate in safe mode and compare the actual resistance of the communication channel 104 to the acceptable resistance. When PD 106 operates in the safe mode, PSE 102 provides only enough power to operate PD port units 148a-b.

If the resistance of communication channel 104 is not low enough for PD 106 to operate in a safe mode, PSE 102 can cease providing power to PD 106 in block 312. Power management engine 210 can configure PSE 102 to cease providing power by generating control signals that computing device 164 can transmit to PSE 102. An alarm or other type of notification can be outputted to notify that PSE 102 ceased providing power and to provide information about possible problems with the system that caused the PSE 102 to cease providing power.

If the resistance of communication channel 104 is low enough for PD 106 to operate in a safe mode, PSE 102 can provide sufficient power for safe mode operation in block 314. Power management engine 210 can configure PSE 102 to provide sufficient power for safe mode operation by generating control signals that computing device 164, if disposed in PD 106, can transmit to PSE 102. Power management engine 210 can configure PD 106 to operate in safe mode by generating control signals that computing device 164 can provide to PD 106 as data in Ethernet packets. A notification can be outputted to notify that the system is operating in safe mode with, optionally, an explanatory statement as to why the system is operating in safe mode.

If the resistance of communication channel 104 does not exceed an acceptable threshold resistance, power management engine 210 determines the amount of power that can safely be provided to the PD 106 in block 316. For example, power management engine 210 can reference threshold data 212 to determine the maximum power level for the resistance of communication channel 104. Threshold data 212 can include information on the maximum power level for a determined resistance of communication channel 104. The maximum power level can be the amount of power at which the communication channel 104 can carry power safely to the PD 106.

Figure 5:
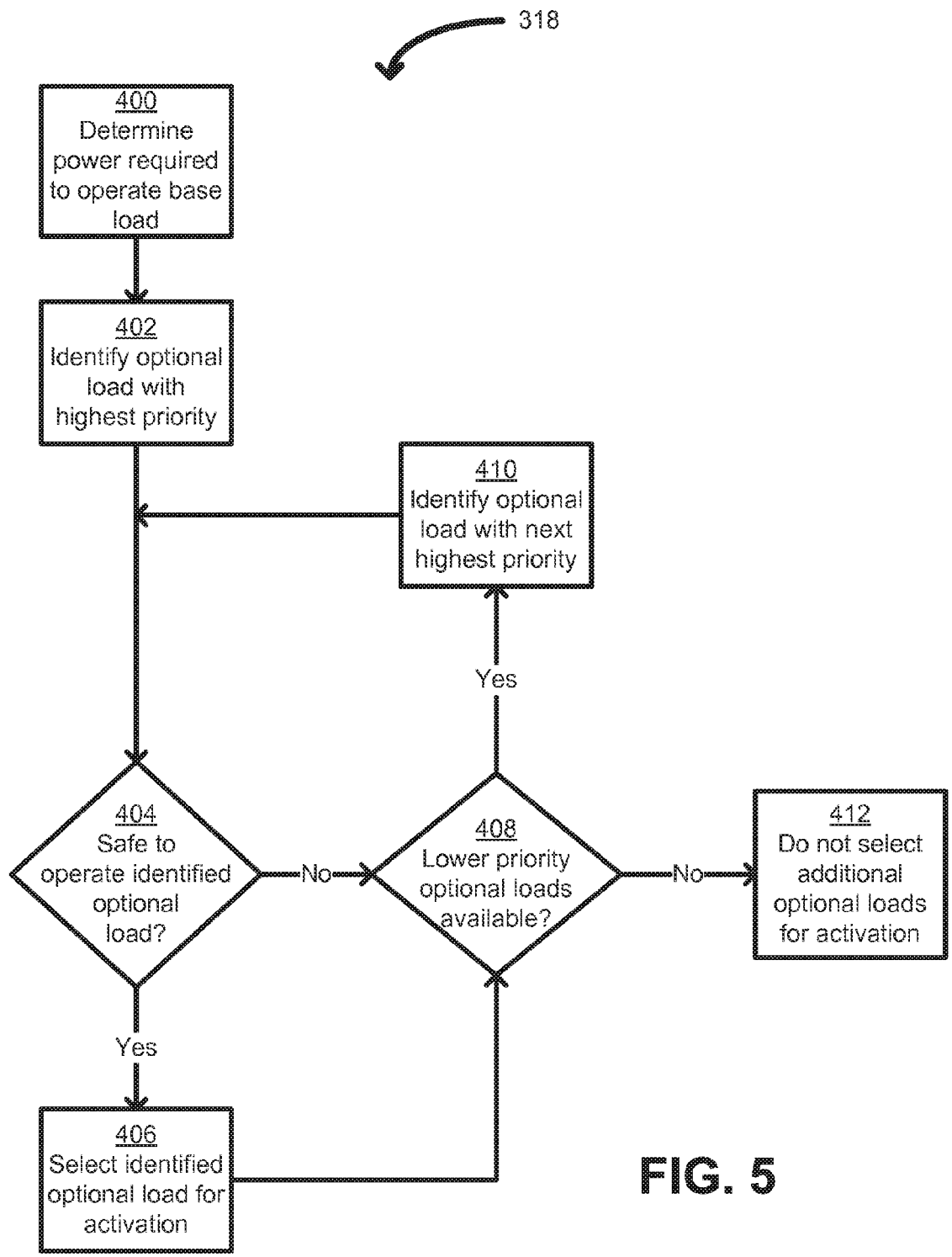
FIG. 5 is a flow chart illustrating a process for selectively providing power to optional power loads of a powered device in a PoE system according to one aspect.

In block 318, the power management engine 210 can determine the amount of power to be provided to the PD 106, The amount of power to be provided to the PD 106 can depend on the power load requirements in the PD 106 and the amount of power that the communication channel 104 can safely carry to PD 106 (i.e., the maximum power level). The power management engine 210 can determine the amount of power to be provided to the PD 106 using various methods. In one aspect, the power management engine 210 accesses a table of levels stored in memory 204 that include a power requirement for a type of PD 106 coupled to the communication channel 104, and compares the power requirement to the maximum power level to ensure that the maximum power level is greater than the power requirement. In other aspects, and as discussed in detail with respect to FIG. 5, the power management engine 210 determines the amount of power to be provided to the PD 106 by the PD 106 selectively activating optional loads, as limited by the maximum power level, and communicating information associated with the optional loads to the power management engine 210.

In some aspects, power management engine 210 can select a pre-determined maximum power supplied by PSE 102 as the amount of power to be provided to the PD 106, or limit the amount of power to the maximum power requirement of PD 106. The maximum power requirement of PD 106 can be determined by referencing load data 214. The maximum power requirement of PD 106 may be the combined power requirements of base load 150 and all optional loads 152a-b. Power management engine 210 can select between the power levels based on whether either will exceed the maximum power level for the resistance of communication channel 104, as specified in threshold data 212. The power management engine 210 may also display a suggested or needed power level to a technician responsible for manually configuring the power level.

In block 320, power management engine 210 configures PSE 102 to increase power to PD 106 by the amount determined in block 318. Power management engine 210 can configure PSE 102 to provide the amount of power determined in block 318 to PD 106 by generating control signals that computing device 164 can transmit to PSE 102. Computing device 164, if disposed in PD 106, can communicate the control signal to PSE 102 as packetized data provided over the powered pair 130, 136 used for data communication. Power management engine 210 can also generate a control signal to activate PD 106. In other aspects in which computing device 164 is disposed in the PSE 102, the power management engine 210 can output controls signals to the PSE 102 and output a control signal, that is provided as data in an Ethernet packet, to PD 106.

In some aspects, power management engine 210 can configure PSE 102 to determine whether a resistive load, such as base load 150 or optional loads 152a-b, is detected prior to executing blocks 304 through 310. PSE controllers 113, 123 can communicate with PD controllers 159a-b to determine whether a resistive load is available to receive power from PSE 102. PSE controllers 113, 123 can communicate with PD controllers 159a-b using Ethernet data packets provided over communication channel 104. If PSE controllers 113. 123 are unable to establish a data link with one of the PD controllers 159a-b, PSE controllers 113, 123 may determine that a short circuit exists in one or more of powered pairs 130, 136 of communication channel 104. If a short circuit exists in one of the powered pairs, blocks 304 through 320 may be executed using the powered pair 130, 136 that does not include the short circuit, rather than the entire communication channel 104.

As noted above, FIG. 5 depicts a process according to some aspects for determining an amount of power to be provided to the PD 106. In block 400 of FIG. 5, power management engine 210 determines the amount of power required to activate base load 150. Power management engine 210 can determine the power requirements of base load 150 by referencing load data 214. Load data 214 can include information on the power requirements for base load 150.

In block 402, power management engine 210 identifies the optional load 152a-b with the highest priority. Optional loads 152a-b can be one or more digital signal processing boards that extend the available frequency range of the remote antenna unit. Power management engine 210 can reference load data 214 to determine the priority of optional loads 152a-b. Load data 214 can include the power requirements and associated priority for each optional load 152a-b. The priority of each optional load 152a-b may depend on the frequency ranges needed for a particular coverage area of DAS 10. The frequency ranges needed for a particular coverage area of DAS 10 may depend on the expected number of user devices using a particular frequency that are operated within the coverage area. The power requirements of each optional load 152a-b can correspond to the complexity of the processing circuitry required to extend the frequency range of a remote antenna unit.

In block 404, power management engine 210 determines whether PSE 102 can safely provide sufficient power to the identified optional load 152a-b with the highest priority. Power management engine 210 can determine whether PSE 102 can safely provide additional power by comparing the power required by the base load and the optional load having the highest priority to the maximum power level determined for the communication channel 104. In some aspects, PSE 102 is unable to provide power safely to the identified optional load 152a-b if the total power provided on communication channel 104 would exceed the maximum power level. The total power can be the combined power requirements of base load 150 and the identified optional load 152a-b having the highest priority.

If the PSE 102 can safely provide sufficient power to the identified optional load 152a-b with the highest priority, power management engine 210 selects the identified optional load 152a-b for activation in block 406. Power management engine 210 can generate a control signal for computing device 164 to provide to PD 106 to activate the identified optional load 152a-b with the highest priority. Power management engine 210 can also generate a command to PSE 102 to increase power to a power level that can power the base load 150 and the identified optional load 152a-b having the highest priority to activate the identified optional load 152a-b. Computing device 164, if disposed in PD 106, can communicate the command to PSE 102 as Ethernet packets provided over the powered pair 130, 136 used for data communication. In other aspects, the computing device 164 is disposed in the PSE 102 and can control the PSE 102 using control signals.

In block 408, power management engine 210 determines whether another optional load 152a-b with a lower priority is available, either after determining that it is unsafe to operate a higher priority optional load in block 404 or after activating the higher priority optional load in block 406. Power management engine 210 can determine if an optional load 152a-b with a lower priority is available by referencing load data 214 to identify any optional loads 152a-b not yet selected for activation and priorities associated with those optional loads 152a-b.

If an optional load 152a-b with a lower priority is available, power management engine 210 identifies the optional load 152a-b with the next highest priority in block 410. Power management engine 210 can reference load data 214 to determine which of the inactive optional loads 152a-b identified in block 408 has the next highest priority. The process returns to block 404 to determine iteratively whether the optional load having the next highest priority can be safely activated based on the resistance of communication channel 104 and the total power of the base load 150, any activated optional loads, and the optional load having the next highest priority. This process may continue until no optional loads are available for which the communication channel 104 can carry the additional power needed to activate.

If no optional load 152a-b with a lower priority is available for which power can be safely carried by communication channel 104, power management engine 210 does not select any additional optional loads 152a-b for activation in block 412. The PSE 102 can provide power at a power level that is configured in block 406, or in block 400 if no optional loads are present or if no optional loads are present for which the communication channel 104 can carry the additional power needed to activate.

Balancing Power Among Channel Pairs

Figure 6:
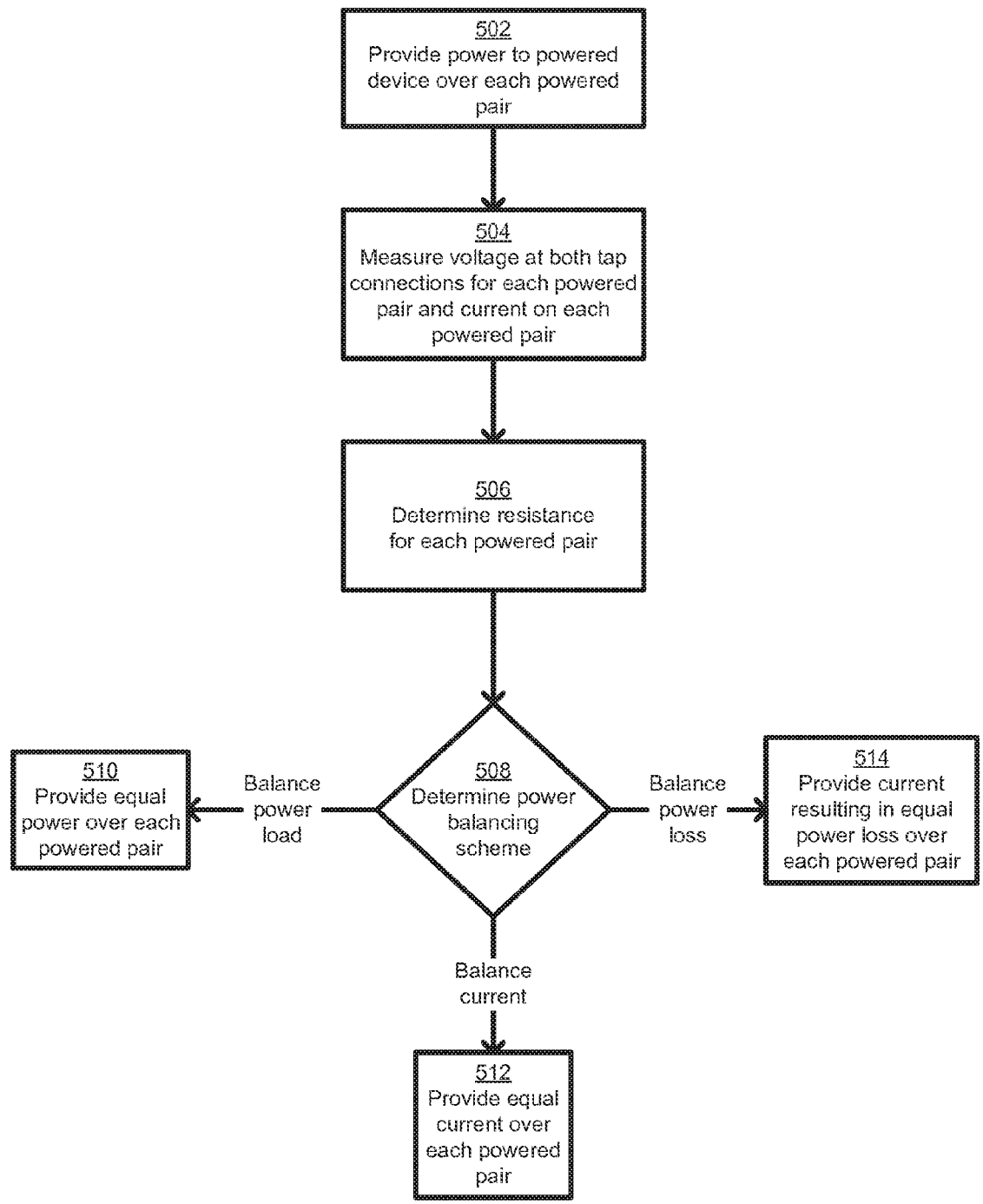
FIG. 6 is a flow chart illustrating a process for balancing power loads among powered channel pairs in a PoE system according to one aspect.

PSE port units 108, 118 can provide power to a common PD 106 independently of one another. In some aspects, PoE system 100 can balance the power provided over powered pairs 130, 136 to coordinate the operation of PSE port units 108, 118. FIG. 6 depicts a flow chart illustrating a process for balancing power loads according to one aspect. The process is described with reference to the PoE system 100 depicted in FIG. 2 and the system implementation shown in FIG. 3. Other implementations and processes, however, are possible.

In block 502, power management engine 210 configures PSE 102 to provide power to PD 106 over each powered pair 130, 136. Power management engine 210 may configure PSE 102 to provide power over each powered pair 130, 136 by generating control signals that computing device 164 can transmit to PSE 102. In some aspects, the power provided over each powered pair 130, 136 may not exceed the maximum power provided in PoE systems as specified according to standardized PoE protocols.

In block 504, measurement devices 160a-b, 162a-b measure the input voltages at tap connections 116, 126 and the output voltages at tap connections 116, 126, 144, 146. Measurement devices 160a-b, 162a-b measure the current on each powered pair 130, 136.

In block 506, power management engine 210 determines the resistance of each powered channel pair 130, 136. The resistance of each powered pair can be determined by dividing the voltage difference between respective tap connections by the current on respective powered pair.

In block 508, power management engine 210 determines which power balancing scheme to apply. The power schemes may include power load balancing, current balancing, and power loss balancing. In some aspects, power management engine 210 can be pre-configured to select a given power-balancing scheme. In other aspects, power management engine 210 may provide the resistances of powered pairs 130, 136 to a user device communicatively coupled to computing device 164. Power management engine 210 may receive from a user input a selection of a power management scheme through the user device.

If power load balancing is determined to be the power scheme applied, power management engine 210 causes the power load among powered pairs 130, 136 to be balanced in block 510. For example, power management engine 210 can configure PSE port units 108, 118 to provide equal power over each powered pair 130, 136 such that each powered pair carries half of the power to be provided by the PSE port units 108, 118. The powered pair with a lower resistance may dissipate less power compared to the powered pair with higher resistance. Although lower in total efficiency compared to the other power balancing schemes, balancing the power load can simplify the control of powered pairs 130, 136 with respect to each other. After power management engine 210 applies the power management scheme, power management engine 210 can configure power control circuitry 158 to distribute the power received from each powered pair among the base load 150 and optional loads 152a-b.

If current balancing is determined to be the power scheme applied, power management engine 210 causes the current among powered pairs 130, 136 to be balanced in block 512. For example, power management engine 210 can configure PSE port units 108, 118 to provide equal current over each powered pair 130, 136. At a given power requirement for PD 106, a balanced current flow for each powered pair 130, 136 can dissipate less power over the powered pair with lower resistance compared to the powered pair with higher resistance. As with power load balancing, balancing the current can simplify the control of powered pairs 130, 136 with respect to each other. After power management engine 210 applies the power management scheme, power management engine 210 can configure power control circuitry 158 to distribute the power received from each powered pair among the base load 150 and optional loads 152a-b.

If power loss balancing is determined to be the power scheme applied, power management engine 210 balances the power loss among powered pairs 130, 136 in block 514. The power loss of each powered pair 130, 136 is the voltage difference across the powered pair multiplied by the current on each powered pair. Power management engine 210 can configure PSE port units 108, 118 to adjust current over each powered pair 130, 136 to equalize power loss for each powered pair. Balancing the power loss among powered pairs 130, 136 can minimize the total power loss of communication channel 104. After power management engine 210 applies the power management scheme, power management engine 210 can configure power control circuitry 158 to distribute the power received from each powered pair among the base load 150 and optional loads 152a-b.

Figure 7:
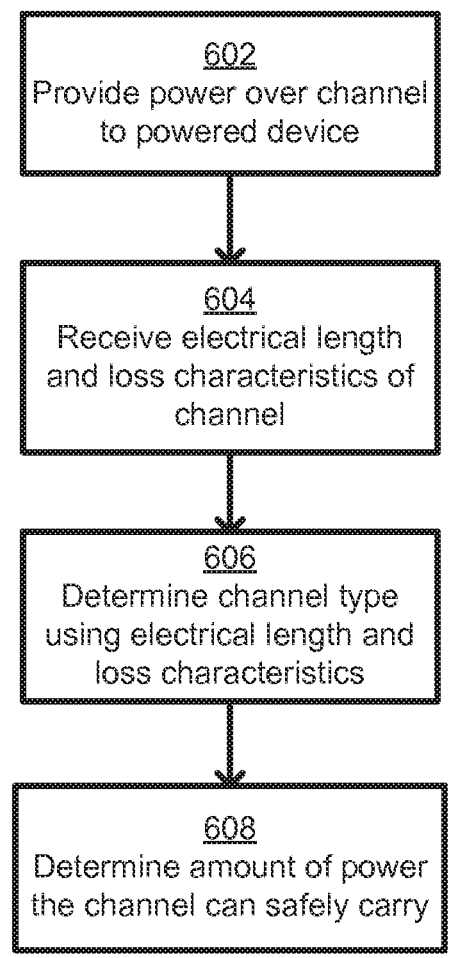
FIG. 7 is a flow chart illustrating a process for adjusting power provided to a powered device based on the channel type in a PoE system according to one aspect.

FIG. 7 illustrates a process for adjusting power provided to a PD based on the channel type of communication channel 104 in the PoE system of FIGS. 2 and 3 according to one aspect. The process can be used to determine the maximum power that can be safely provided over a communication channel of a determined channel type used in the PoE system, without determining the channel resistance from the measurements of voltage and current. The PoE system can determine whether to increase power or to cease operating, as in the process depicted in FIG. 4.

In block 602, power management engine 210 configures PSE 102 to provide power to PD 106 over communication channel 104. In some aspects, the power from PSE 102 may not exceed the maximum power provided in PoE systems as specified according to standardized PoE protocols. For example, the level of power provided over communication channel 104 may be less than full power or otherwise at some minimal power level at which the quality of the communication channel 104 can be assessed.

In block 604, the power management engine 210 receives the electrical length and loss characteristics of communication channel 104. In some aspects, PHY 156 can determine the electrical length and loss characteristics and provide them to power management engine 210. In other aspects, computing device 164 may communicate with PSE 102 via communication channel 104 to request that PHY devices 110, 120 determine the electrical length and loss characteristics for PSE 102 and provide them to power management engine 210 via computing device 164. Computing device 164, if disposed in PD 106, can communicate the request to PSE 102 as Ethernet packets provided over the powered pair 130, 136 used for data communication.

In block 606, power management engine 210 determines the channel type of communication channel 104 using the electrical length and loss characteristics of the channel. Power management engine 210 can determine the channel type by accessing a data file stored in memory 204. The data file can include various types of data, such as the electrical length and loss characteristics of the channel, for various channel types. Power management engine 210 can compare the electrical length and loss characteristics of communication channel 104 to the various electrical lengths and loss characteristics in the data file and identify the corresponding channel type.

In block 608, power management engine 210 determines the amount of power the communication channel 104 can safely carry based on the channel type. In some aspects, a data file stored in memory 204 can include a table that can include ranges of acceptable power levels that can be provided over various types of channels. Power management engine 210 can access the data file to determine the acceptable ranges of power that can be provide over the channel type for the communication channel 104.

The power management engine 210 can determine whether to increase the power based on the amount of power that can be safely transported over the communication channel 104. If the power cannot be safely increased, the power management engine 210 can determine if enough power can be safely provided over the communication channel 104 for the PD 106 to operate in a "safe" mode, as in block 310 of the process depicted FIG. 4. The power management engine 210 can access a data file stored in memory 204 to determine whether the maximum power provided over the channel type for communication channel 104 can support safe mode operation. If enough power cannot be safely provided over the communication channel 104 for the PD 106 to operate in a safe mode, the power management engine 210 can configure the PSE 102 to cease providing power to PD 106, as in block 312 of the process depicted FIG. 4. If enough power can be safely provided over the communication channel 104 for the PD 106 to operate in a safe mode, PSE 102 can provide sufficient power for safe mode operation as in block 314 of the process depicted FIG. 4. If the power can be safely increased, the power management engine 210 can determine the amount of power to be provided to the PD 106 and increase power accordingly, as in blocks 318-320 of the process depicted FIG. 4.

Although aspects have been described with respect to channels that include cables that are Ethernet cables and Ethernet protocols, the systems and processes described above can be implemented using one or more channels having any suitable cable having at least one conductive material over which both electrical energy, such as power and signals representing data, can be provided.

For example, a system may include a PSE coupled to a PD over a communication channel that includes a coaxial cable. The PSE can provide data and power over the coaxial cable to the PD. The coaxial cable can include an electrical cable with a center conductor, a tubular insulating layer disposed radially exterior to the center conductor, and a tubular shield conductor disposed radially exterior to the tubular insulating layer. The coaxial cable can receive data from a PHY device. Power can be provided over the coaxial cable by providing current from a power source to the center conductor and receiving return current via the shield conductor. Current can be provided to the center conductor via a device such as a bias T. In this aspect, the bias T can replace magnetics used to provide power to the powered pairs of an Ethernet cable.

In another aspect, the system may include a communication channel that includes an optical fiber and a parallel power channel that includes an electrical cable. The optical fiber can carry data and the electrical cable can carry power. The optical fiber can receive data from the PHY device. The electrical cable can be connected to a PSE controller or power supply, which may obviate the need for a separate component, such as magnetics or a bias T.

The foregoing description of the aspects, including illustrated aspects, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

The invention claimed is:

1. A system, comprising:
   power sourcing equipment configured for providing power to a powered device via a channel; and
   a sub-system configured for:
   determining, based on a resistance of the channel, an amount by which to increase a level of power provided to the powered device by:
   selecting a base load in the powered device to receive power,
   determining respective priorities for a plurality of optional loads in the powered device,
   determining a respective power requirement of each of the plurality of optional loads in the powered device, and
   selecting one or more optional loads selected to receive power in order of priority until a power requirement of an additional optional load would cause the level of power provided to the powered device to exceed a maximum level of power based on the resistance of the channel;
   wherein the power sourcing equipment is configured to adjust the level of power by the amount in response to a command from the sub-system, wherein the amount is equal to a sum of the respective power requirements of the base load and the one or more optional loads selected to receive power.

2. The system of claim 1, wherein the power sourcing equipment is disposed in a master unit of a distributed antenna system.

3. The system of claim 2, wherein the powered device is a remote antenna unit of the distributed antenna system and wherein the channel comprises one or more physical components configured for transmitting information from one network location to a second network location, the physical components comprising at least two of a cable, cordage, a patch panel, an outlet, or a concentration point.

4. The system of claim 3, wherein the power sourcing equipment is further configured to provide data to the powered device via the channel.

5. The system of claim 1, wherein the power sourcing equipment is further configured for
   providing a first level of power to the powered device, wherein the first level of power is sufficient for the sub-system to determine the resistance of the channel; and
   providing a second level of power to the powered device based on the command from the sub-system.

6. The system of claim 1, wherein the sub-system comprises:
   at least one measurement device configured for:
      measuring an output voltage of the power sourcing equipment;
      measuring an input voltage of the powered device;
      measuring a current on the channel;
   a processor configured for:
      determining the resistance of the channel based on the output voltage, the input voltage, and the current; and
      outputting the command to the power sourcing equipment, the command specifying an increase in the level of power by the amount and specifying load allocation for the powered device.

7. The system of claim 1, wherein the sub-system is further configured for determining that increasing the power provided via the channel is unsafe based on comparing the resistance of the channel to a threshold resistance, wherein the threshold resistance comprises a resistance associated with a temperature increase exceeding a threshold temperature indicating an overall power loss in the channel exceeding a safe level.

8. The system of claim 1, wherein the sub-system is further configured for determining, based on the resistance of the channel, a safe level of power to the powered device, wherein the safe level of power comprises an amount of power sufficient to operate one or more components of the powered device configured to receive signals via the channel.

9. The system of claim 1,
wherein the channel comprises at least two powered pairs over which the power sourcing equipment is configured to provide the power to the powered device,
wherein the sub-system is further configured for:
  determining a respective resistance of each of the at least two powered pairs, and
  adjusting a level of power provided over each of the at least two powered pairs based on a determined power scheme and the respective resistance of each powered pair.

10. The system of claim 9, wherein the determined power scheme comprises one of:
  equalizing power provided over each of the at least two powered pairs;
  equalizing power dissipation over each of the at least two powered pairs; or
  equalizing current provided over each of the at least two powered pairs.

11. The system of claim 1, wherein the sub-system comprises:
  at least one measurement device configured for:
    measuring an output voltage and current of the power sourcing equipment;
  a processor configured for:
    determining the resistance of the channel based on the output voltage, the current and a known impedance of the powered device; and
    outputting the command to the power sourcing equipment, the command specifying an increase in the level of power by the amount and specifying load allocation for the powered device.

12. A system comprising:
  at least one measurement device configured for:
    measuring an output voltage of power sourcing equipment,
    measuring an input voltage of a powered device, and
    measuring a current on a channel coupling power sourcing equipment to the powered device; and
  a processor communicatively coupled to the power sourcing equipment, the processor configured for:
    determining the resistance of the channel based on the output voltage, the input voltage, and the current;
    determining, based on the resistance of the channel, an amount by which to increase a level of power provided to the powered device by:
      selecting a base load in the powered device to receive power,
      determining respective priorities for a plurality of optional loads in the powered device,
      determining a respective power requirement of each of the plurality of optional loads in the powered device, and
      selecting one or more optional loads selected to receive power in order of priority until a power requirement of an additional optional load would cause the level of power provided to the powered device to exceed a maximum level of power based on the resistance of the channel; and
    outputting a command to the power sourcing equipment to increase the level of power and the amount by which to increase the level of power, wherein the amount is equal to a sum of the respective power requirements of the base load and the one or more optional loads selected to receive power.

13. The system of claim 12, wherein the processor is further configured for:
  determining an electrical length and one or more loss characteristics of the channel;
  determining a channel type for the channel based on the electrical length and the one or more loss characteristics; and
  determining a maximum amount of power to be provided via the channel based on the channel type.

14. The system of claim 12, wherein the powered device is a remote antenna unit of a distributed antenna system and wherein the channel comprises an Ethernet cable.

15. The system of claim 12, wherein the powered device is a remote antenna unit of a distributed antenna system that comprises a master unit separate from the remote antenna unit, and wherein the channel comprises a coaxial cable.

16. The system of claim 12, wherein the channel comprises an optical fiber cable and a parallel electrical cable, wherein the power sourcing equipment is configured for providing data to the powered device via the optical fiber cable, wherein determining the resistance of the cable comprises determining the resistance of the parallel electrical cable.

17. A method, comprising:
  determining, based on a resistance of a channel between power sourcing equipment and a powered device, an amount by which to increase a level of power provided to the powered device over the channel, wherein determining the amount comprises:
    selecting a base load in the powered device to receive power,
    determining respective priorities for a plurality of optional loads in the powered device,
    determining a respective power requirement of each of the plurality of optional loads in the powered device, and
    selecting one or more optional loads selected to receive power in order of priority until a power requirement of an additional optional load would cause the level of power provided to the powered device to exceed a maximum level of power based on the resistance of the channel; and
  adjusting the level of power by the amount, wherein the amount is equal to a sum of the respective power requirements of the base load and the one or more optional loads selected to receive power.

18. The method of claim 17, further comprising determining that increasing the power provided via the channel is unsafe based on comparing the resistance of the channel to a threshold resistance, wherein the threshold resistance comprises a resistance associated with a temperature increase exceeding a threshold temperature indicating an overall power loss in the channel exceeding a safe level.

19. The method of claim 17, further comprising determining, based on the resistance of the channel, a safe level of power to the powered device, wherein the safe level of power comprises a minimum amount of power sufficient to operate one or more components of the powered device that receive signals via the channel.

20. The method of claim 17, wherein the channel comprises at least two powered pairs over which the power sourcing equipment provides the power to the powered device, and further comprising:
  determining a respective resistance of each of the at least two powered pairs, and adjusting a level of power provided over each of the at least two powered pairs by equalizing power dissipation over each of the at least two powered pairs.

\* \* \* \* \*